United States Patent
Gauthier-Manuel et al.

(10) Patent No.: US 11,846,589 B2
(45) Date of Patent: Dec. 19, 2023

(54) METHOD OF MANUFACTURE OF AN OPTICAL FIBRE-BASED PH MEASUREMENT SENSOR

(71) Applicants: UNIVERSITE DE FRANCHE-COMTE, Besançon (FR); CENTRE NATIONAL DE LA RECHERCHE SCIENTIFIQUE, Paris (FR)

(72) Inventors: Bernard Gauthier-Manuel, Besançon (FR); Rutjaphan Kateklum, Nonthaburi (TH)

(73) Assignees: UNIVERSITE DE FRANCHE-COMTE, Besançon (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 233 days.

(21) Appl. No.: 17/422,073

(22) PCT Filed: Dec. 30, 2019

(86) PCT No.: PCT/EP2019/087180
§ 371 (c)(1),
(2) Date: Jul. 9, 2021

(87) PCT Pub. No.: WO2020/160835
PCT Pub. Date: Aug. 13, 2020

(65) Prior Publication Data
US 2022/0128478 A1    Apr. 28, 2022

(30) Foreign Application Priority Data
Feb. 8, 2019 (FR) .................. 1901263

(51) Int. Cl.
*G01N 21/77* (2006.01)
*G01N 21/80* (2006.01)

(52) U.S. Cl.
CPC ......... *G01N 21/7703* (2013.01); *G01N 21/80* (2013.01); *G01N 2021/772* (2013.01); *G01N 2021/7786* (2013.01)

(58) Field of Classification Search
CPC .............. G01N 21/7703; G01N 21/80; G01N 2021/772; G01N 2021/7786
(Continued)

(56) References Cited

U.S. PATENT DOCUMENTS

| 5,403,746 A | * | 4/1995 | Bentsen | ............... A61B 5/1455 422/82.07 |
| 5,656,241 A | * | 8/1997 | Seifert | ............... G01N 21/7703 422/82.07 |

FOREIGN PATENT DOCUMENTS

| WO | 88/05533 A1 | 7/1988 | |
| WO | WO-8805533 A | * 7/1988 | ............. C09K 11/06 |

OTHER PUBLICATIONS

Kateklum et al. "Improving the sensitivity of amino-silanized sensors using self-structured silane layers: Application to fluorescence pH measurement", Sensors and actuators B: Chemical, vol. 248, (2017), pp. 605-612 (Year: 2017).*
(Continued)

*Primary Examiner* — Michael M. Bernshteyn
(74) *Attorney, Agent, or Firm* — Greer, Burns & Crain, Ltd

(57) ABSTRACT

A method for manufacturing an ion sensor, especially a pH measurement sensor, based on optical fibre, including the following steps: cleaving the optical fibre, with free hydroxyl groups appearing on the cleavage surface, grafting a layer of trifunctional silane directly on free hydroxyl groups having appeared accordingly on the cleavage surface
(Continued)

of the optical fibre, without a prior external activation step, grafting a layer of difunctional silane on the cleavage surface of the optical fibre, and grafting a fluorescent dye.

16 Claims, 3 Drawing Sheets

(58) Field of Classification Search
USPC .......................................................... 523/200
See application file for complete search history.

(56) References Cited

OTHER PUBLICATIONS

French Search Report received in Application No. 1901263, dated Oct. 29, 2019.
International Search Report and Written Opinion received for PCT/EP2019/087180, dated Mar. 20, 2020.
Gauthier-Manuel, G., et al., "Calibration free and fluorescein based fiber optic pH sensor for clinical applications," Proceedings IEEE Sensors, 2018, ISBN: 978-1-5386-4707-3, Part No. CFP18SEN-ART, pp. 1173-1176.
Kateklum, R., et al., "Improving the sensitivity of amino-silanized sensors using self-structured silane layers: application to fluorescence pH measurement," Sensors and Actuators B: Chemical, 2017, vol. 248, pp. 605-612.

* cited by examiner

METHOD OF MANUFACTURE OF AN OPTICAL FIBRE-BASED PH MEASUREMENT SENSOR

BACKGROUND

The present invention relates to a method for manufacturing an ion sensor based on an optical fibre. It also relates to a system for optical measurement of the pH of a solution by using a sensor designed according to the method of the invention.

A particularly beneficial application of the present invention is for measurement of the pH in low-volume biological systems, but in a broader context it can be applied to measuring pH in the physicochemical field.

Generally, the current industrial requirements are met by the use of a pH meter with miniature glass electrode or an ISFET pH meter. For the former, the volumes required remain high for an application within the biological field for example; and for the latter there are numerous problems associated with the reference electrode.

Fluorescence pH sensors based on optical fibre are known, intended for in vivo measurement. Such sensors use molecules grafted at the cleaved end of an optical fibre; the fluorescence properties of these molecules being dependent on the pH. Molecules make it possible to measure the pH by calculating the ratio of the fluorescence emitted at two different wavelengths. This ratiometric technique requires calibration (benchmarking) and the manufacturers of molecules recommend that users carry out prior benchmarking by using respectively acidic and basic titration endpoints. This benchmarking procedure requires very precise control of the experimental conditions and takes a long time for clinical applications.

The publication "Improving the sensitivity of aminosilanized sensors using self-structured silane layers: Application to fluorescence pH measurement", Rutjaphan Kateklum et al., April 2017, Sensors and Actuators B, Vol. 248, pp. 605-612 is also known. This document describes a method of functionalization of one end of an optical fibre by applying a trifunctional layer and a difunctional layer. One of the problems of the design process described in this publication is the duration and the complexity of design.

The publication "Calibration free and fluorescein based fiber optic pH sensor for clinical applications", Bernard Gauthier-Manuel et al., IEEE SENSORS, 28-31 October, New Delhi, 2018, Proceedings IEEE Sensors, ISBN: 978-1-5386-4707-3, Part Number: CFP18SEN-ART, pp. 1173-1176 is also known. This document describes a calculation method making it possible to obtain a pH value from a fluorescence measurement.

The aim of the present invention is a new rapid and simple functionalization method for a cleaved optical fibre.

Another aim of the invention is to produce a homogeneous functionalized layer, limited to the cleavage zone.

Yet another aim of the invention is the design of a sensor the usage of which does not require calibration.

SUMMARY

At least one of the aforementioned objectives is achieved with a method for manufacturing an ion sensor based on an optical fibre, this method comprising the following steps:
cleavage of the optical fibre, with free hydroxyl groups appearing on the cleaved surface,
grafting a layer of trifunctional silane directly on free hydroxyl groups having thus appeared on the cleaved surface of the optical fibre, without a prior exogenous activation step,
grafting a layer of difunctional silane on the cleaved surface of the optical fibre,
grafting a fluorescent dye.

The method according to the invention makes it possible to produce an active layer that is particularly homogeneous and clean on the cleaved section of the optical fibre. Such a layer is easily reproducible.

Unlike the conventional technique of the prior art that consists of generating hydroxyl functions by exogenous activation such as for example by the use of a UV-ozone method or a piranha mixture, the method according to the invention makes it possible to graft the silane directly on free hydroxyl groups that have appeared following the cleavage. The inventors became aware of the spontaneous presence of the free Si—OH functions during cleavage. In fact, the cleavage produces free hydroxyl groups on which a silane layer can be directly grafted.

It is no longer necessary, as in the prior art, to carry out an activation operation by UV, which takes a long time and requires restrictive precautions. This activation operation had the aim of creating free Si—OH functions on the end of the optical fibre. But unfortunately, it was difficult to limit this activation only to the cleaved section (the cleavage surface) of the optical fibre.

With the method according to the invention, the grafting procedure is considerably simplified. The molecules are grafted only on the cleavage surface at the end of the cleaved fibre, the only active zone. A sensor designed in this way allows a pH measurement without calibration on very small samples.

The invention is notable in particular for the fact that the first grafting step consists of producing a thin layer of trifunctional silane having graftable sites. The second step makes it possible in particular to graft a linear polymer of difunctional silane to create an active layer of the desired thickness. In fact, grafting on a silica surface requires two functions. Use of a difunctional silane can only generate monolayers, which is insufficient to obtain a usable fluorescence signal. Use of a trifunctional silane generates dense multilayers that will only be able to fix the large molecules of dye at the surface, which will not contribute to significantly increasing the signal. Thus, the two grafting steps according to the invention make it possible to obtain a layer capable of being functionalized at depth and a usable fluorescence signal level.

According to the invention, the steps of grafting a layer of trifunctional silane and grafting a layer of difunctional silane can be carried out simultaneously by a mixture containing less than 1% trifunctional silane. It is thus possible to produce a layer with a mixture of difunctional and trifunctional silane but with a very small proportion of trifunctional silane in order to cross-link the chains of difunctional silane. This makes it possible to form a gel-type structure instead of a brush-type structure when the steps are separate and successive.

A sensor is thus constituted by the cleaved optical fibre comprising on its cleavage surface fluorescent molecules sensitive to pH.

According to an advantageous characteristic of the invention, the difunctional silane can be an amino-silane compound making it possible to constitute a surface of amine compounds for grafting the fluorescent dye.

In other words, the grafting is carried out in two phases. In a first phase, amine functions are generated by grafting an amino-silane. In a second phase, fluorescent molecules are grafted, comprising a reactive radical vis-à-vis an amine group.

The reaction between the amine functions and the amino-sensitive functions of the fluorescent dye chosen allows covalent fixing of the optically active molecules in the silane layer.

By way of non-limitative example, grafting the fluorescent dye can be carried out by using a succinimidyl ester function as coupling agent with the aminated surface.

According to an advantageous characteristic of the invention, grafting of the fluorescent dye can be carried out by using a sulfonyl chloride as coupling agent with the aminated surface. An isothiocyanate can also be used as coupling agent with the aminated surface.

According to an embodiment of the invention, the difunctional silane can be a thiol compound making it possible to constitute a surface of thiol compounds for grafting the fluorescent dye. An iodoacetamide or a maleimide can also be used as coupling agent with the surface of thiol compounds.

It has been observed that the free hydroxyl functions obtained after cleavage have a tendency to disappear after some time.

According to an advantageous embodiment of the invention, the step of grafting the layer of trifunctional silane can be carried out within a period of time less than 1 minute or within the 30 minutes following cleavage of the optical fibre. In other words, grafting the trifunctional silane is carried out as quickly as possible, in order to have the maximum free SiOH functions.

It can even be envisaged to carry out this grafting within the hour following cleavage.

The grafting must be carried out on a freshly cleaved surface, i.e. within a predetermined period of time during which the hydroxyl functions that appeared spontaneously are still free. It is possible to determine by experimentation, from what moment after cleavage the level of free hydroxyl functions is no longer sufficient to carry out effective grafting of a thin layer of trifunctional silane. This determination is obtained depending for example on the type of optical fibre, the ambient temperature, and the environment.

According to an advantageous characteristic of the invention, the optical fibre has a hydroxyl ion content greater than 10 ppm, preferably between 100 and 1200 ppm.

More generally, an optical fibre called a high hydroxyl (OH) ion content optical fibre is concerned. With such an optical fibre, a high concentration of free hydroxyl functions on cleavage is assured.

According to an embodiment, the silane can comprise at least one reactive radical of the $C_{1-10}$ alkoxy group, such as for example ethoxy, methoxy, propoxy or butoxy.

According to an embodiment of the invention, the silane can comprise at least one reactive radical based on halogen atoms such as for example fluorine, chlorine, bromine, etc.

According to another aspect of the invention, a system for optical measurement of the pH of a solution is proposed, comprising:
  an optical fibre having fluorescent molecules grafted on a first end of the optical fibre according to a method such as described above,
  a light source for exciting the fluorescent molecules from a second end, via the optical fibre,
  a spectrometer for obtaining a fluorescence signal originating from the fluorescent molecules via the second end, and
  a processing unit for determining the pH of the solution.

BRIEF DESCRIPTION OF THE DRAWINGS

Other advantages and characteristics will become apparent on examination of the detailed description of embodiment examples that are in no way limitative, and from the attached drawings, in which.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

Although the invention is not limited thereto, a method will now be described for functionalization of an optical fibre according to the invention, using a succinimidyl ester function as coupling agent with an amino-silane surface.

Generally, trifunctional silane and difunctional silane are prepared upstream in solutions that are then used with a large number of optical fibres. For example, it is possible to use a polypropylene flask that is fixed in a glass bottle. The flask is filled with a solution of trifunctional silane. Advantageously, one of the polypropylene adjuvants acts as catalyst. Toluene can also be used as solvent and reach a pH of 2. Other solvents can be used. The bottle and flask assembly is then placed in a freezer in order to interrupt polymerization.

Another flask is filled in a similar way with difunctional silane. This flask is fixed to another glass bottle. The assembly is put into an oven at 60° for several hours. The period of time in the oven depends on the desired length of the silane chains, in fact on the desired number of $NH_2$ groups. The bottle and flask assembly is then placed in a freezer in order to interrupt polymerization.

Figure 1:
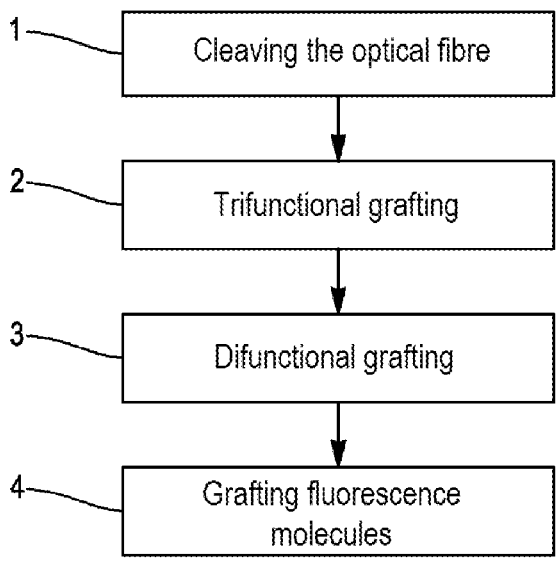
FIG. 1 is a flowchart showing the different steps of the method of functionalization of an optical fibre according to the invention.

FIG. 1 is a flowchart showing the different steps of the method of functionalization of an optical fibre according to the invention. Four steps are set out: cleavage, trifunctional grafting, difunctional grafting, and grafting of fluorescent molecules. These different steps will be revisited below, with reference to FIGS. 1 to 5.

In step 1, the end of the optical fibre is stripped and cleaved. After prior defrosting of the trifunctional silane solution, the freshly cleaved end of the optical fibre is submerged in the solution of trifunctional silane during a step 2 of trifunctional grafting.

Figure 2:
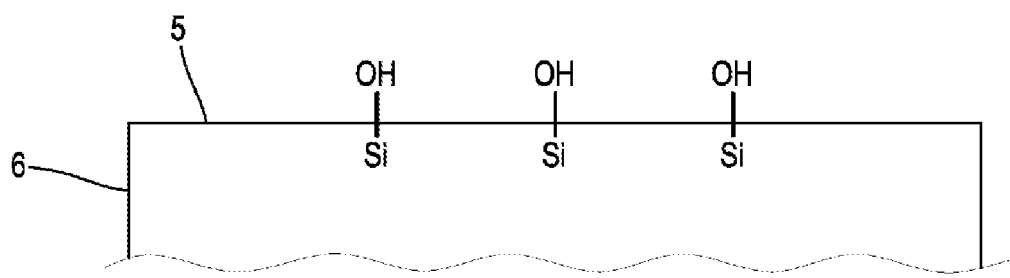
FIG. 2 is a diagrammatic representation of a cross section view of one end of an optical fibre after cleavage according to the invention.

As can be seen in FIG. 2, free hydroxyl OH ions are spontaneously present on the cleaved surface 5 of the optical fibre 6 and remain available during some time. To this end, a step index multimode optical fibre having an OH ion content greater than 10 ppm is used. A high ion content.

In the present case, only a few minutes separate step 1 of cleavage from step 2 of grafting trifunctional silane, such that during this period of a few minutes, a minimum of free hydroxyl OH functions are lost by bonding with contaminants in the atmosphere. It is not necessary to carry out activation by UV-ozone radiation or by using a piranha mixture or any other method. Step 2 of grafting trifunctional silane is carried out at ambient temperature for a few minutes. This is sufficient to form the trifunctional thin layer completely.

Advantageously, the trifunctional and difunctional grafts use silane. A silane molecule is constituted by three parts. A first part formed by the silicon atom comprising 1, 2 or 3 bonds with a second part comprising a reactive radical R that may be an alkoxyl group, halogen atoms or a hydroxyl group. For example, the alkoxyl group can comprise an ethoxyl group —$OCH_2CH_3$, a methoxyl group —$OCH_3$, referring then to alkoxysilane, and the halogen atoms can comprise a chloride —Cl, referring then to chlorosilane.

The third part is one or several remaining bonds of the silicon atom with a carbon atom of an aliphatic chain called spacer, terminated by a functional group (—SH, —$NH_2$, COOH, —$CH_3$, —OH, etc.), such functional group determining the properties of the final product. The length of this spacer is variable and can even be omitted, as for example in triethoxysilane.

The number of reactive radicals R defines the number of Si—O—Si bonds that it is possible to produce during the grafting reaction. A silica surface requires two bonds of this type to attach the silicon atom correctly. Therefore the use of a difunctional silane (two functional groups) can only result in the creation of a monolayer. To increase the thickness of the grafted layer, advantageously a trifunctional silane is used (three functional groups) to create the first grafted layer and thus to have an additional function available.

Figure 3:
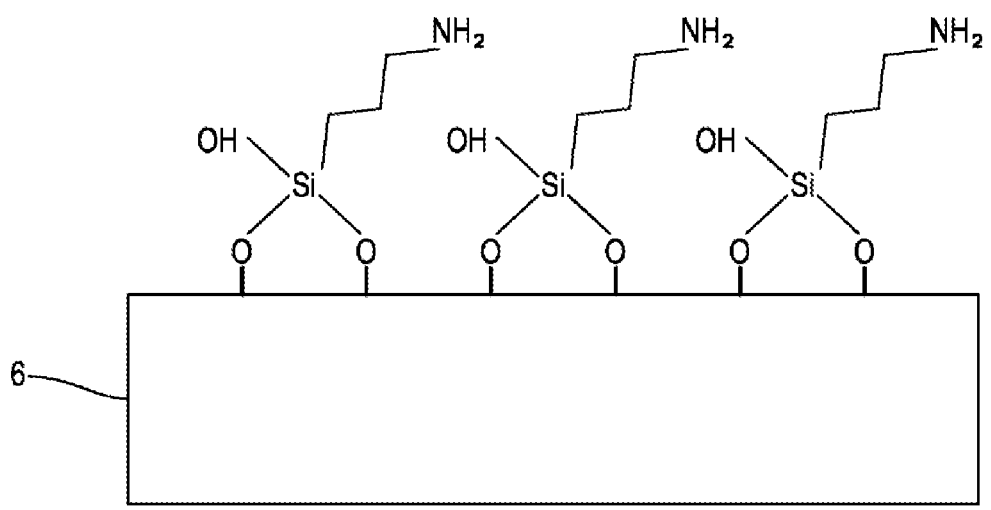
FIG. 3 is a diagrammatic representation of a cross section view of the end of the optical fibre in FIG. 2 on which a trifunctional grafting has been carried out.

In FIG. 3, it can be seen that the amino-silane molecules have bonded to oxygen atoms of the OH groups that were free immediately after cleavage. Such an arrangement theoretically proposes as available a radical R such as for example an $NH_2$ amine radical and an OH radical on which a difunctional amino-silane will be grafted.

In step 3 in FIG. 1, the optical fibre is then submerged in the solution of difunctional silane for several hours at ambient temperature. Similarly, it is not necessary to place the assembly in an oven. Then, the optical fibre is rinsed in toluene and in DMSO (dimethyl sulfoxide). The latter being used to wash away everything that is not covalently grafted.

Figure 4:
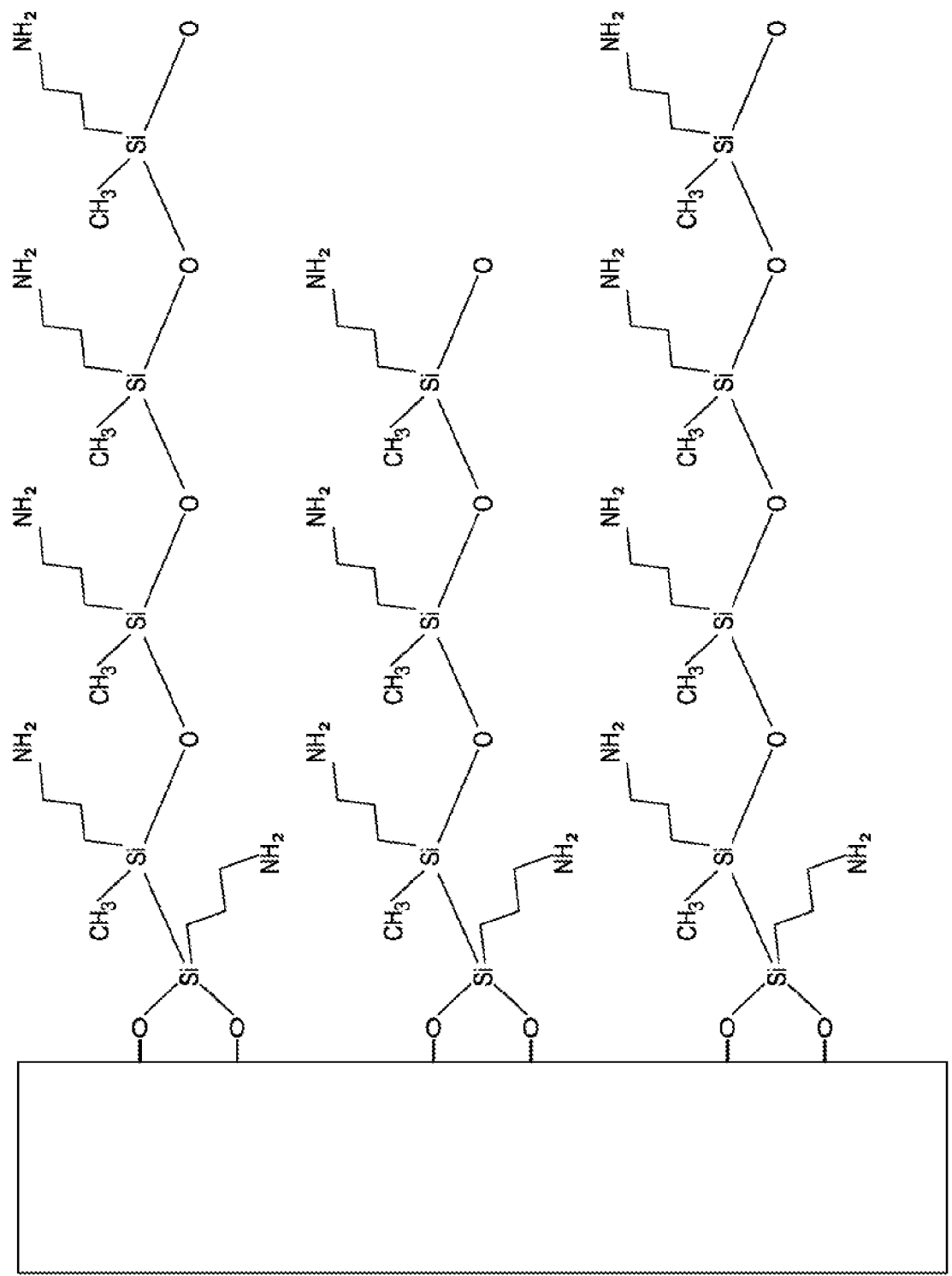
FIG. 4 is a diagrammatic representation of a cross section view of the end of the optical fibre in FIG. 3 on which grafting of difunctional chains has been carried out.

In FIG. 4, the chains of molecules of the linear polymer of difunctional amino-silane come into contact with the trifunctional layer and bond thereto by covalent bonding. The short chains bond more rapidly than the long chains. It is noted that the $NH_2$ amine functions are available. The layer is not developed on the lateral walls of the fibre. As the trifunctional layer exists only at the end of the fibre, on the cleaved section, the difunctional layer is developed mainly, or only, on this section. The lateral walls of the optical fibre 6 in FIG. 4 can optionally receive several silane chains, but the layer is developed in the prolongation of the optical fibre, at its end, on the cleaved surface.

In step 4 in FIG. 1, the optical fibre is submerged in a solution of fluorescent molecules so as to covalently graft sufficient fluorescent molecules on all the available $NH_2$ amine functions. This step 4 can take several hours or less, for example six hours. At the end, the optical fibre is optionally washed in water, then rinsed. Rinsing can also be carried out with DMSO (dimethylsulfoxide), which eliminates all the molecules that are not bonded with covalent bonds to the support.

Figure 5:
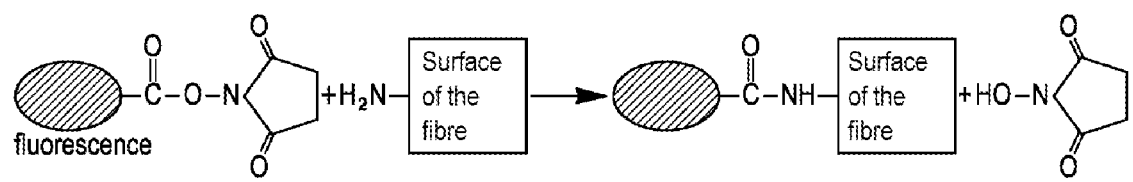
FIG. 5 is a diagrammatic representation of a chemical process during grafting of fluorescent molecules on the end of the optical fibre in FIG. 4.

FIG. 5 is a chemical equation showing the grafting of fluorescence molecules on the difunctional layer. A succinimidyl ester function for example is used as coupling agent with the aminated surface. This ester comprises a fluorophore such as for example fluorescein diacetate. Combining with the aminated surface makes it possible to obtain a surface bearing the fluorophore via a CONH bond. Once again, the development of the layer takes place mainly on the cleavage surface, which makes it possible to obtain an active zone distributed along the difunctional chains. This improves the efficiency of detection of the fluorescence.

Several fluorophores can be used. In the example described, the silane layer has available amine groups. Different coupling agents between the fluorophore and the aminated surface can be used, such as for example:

a succinimidyl ester function as described above,
a sulfonyl chloride,
an isothiocyanate function,
etc.

It is also possible to have instead of the amine functions, thiolated HS functions on which molecules reactive to thiols will be grafted. For example, using the following as coupling agent is possible:

iodoacetamide,
maleimide,
etc.

These lists are non-limitative and other molecules can be used: 7-hydroxycoumarin-3-carboxylic acid N-succinimidyl ester (graftable on an aminated surface) or else pHrodo iFL Red STP Ester (graftable on an aminated surface).

Figure 6:
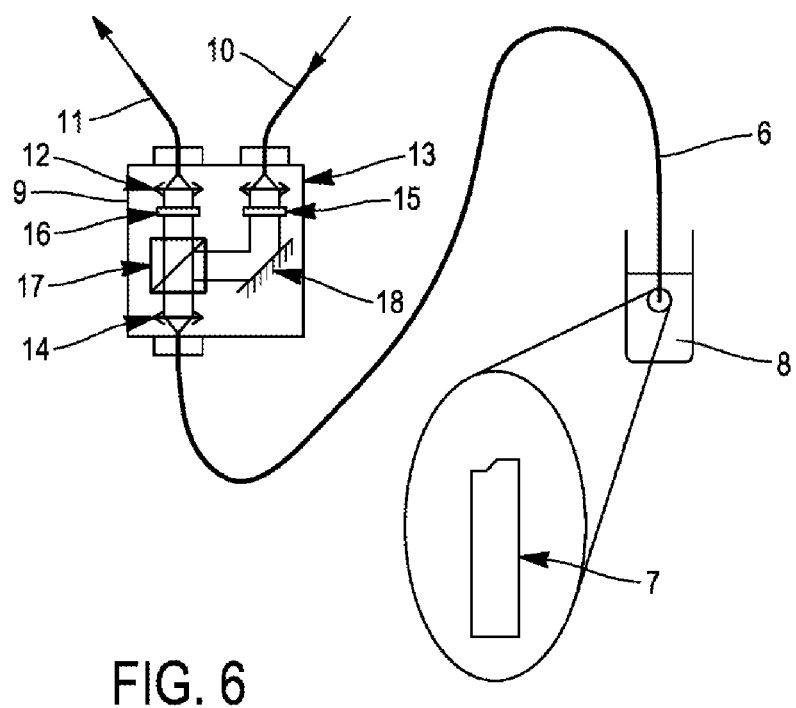
FIG. 6 is a diagrammatic representation of a system for optical measurement of pH according to the invention.

A system for optical measurement of the pH of a solution by using the optical fibre designed according to the method of the invention will now be described with reference to FIG. 6. The optical fibre 6 according to the invention can be seen, having a diameter of 200 μm for example, the free end of which comprises a functionalized layer 7. This is a layer comprising fluorescent molecules that are sensitive to the pH of the solution 8 to be measured. The other end of the fibre 6 is connected to a beam splitter. The latter is connected to an excitation route 10 and a measurement route 11. The excitation route 11 is intended to receive an excitation signal originating from a laser at 488 nm (not shown). The measurement route is intended to transmit the fluorescence signal originating from the functionalized layer 7 to a spectrometer (not shown).

The molecules are directly excited by the light emitted by the optical fibre 6 at the chosen wavelength. The fluorescence is collected by this same fibre and transmitted to the spectrometer via the beam splitter 9. The latter is equipped with a dichroic prism 17 filtering the emission line so as to send only the fluorescence signal to the spectrometer. Also shown in the beam splitter 9 are collimation lenses 12-14, an excitation filter 15 for having the cleanest possible excitation signal, and an emission filter 16 for the signal going to the spectrometer. A mirror 18 is placed between the excitation filter 15 and the dichroic prism 17 so as to orient the excitation beam towards this dichroic prism.

The optical fibre 6 acts both as pH sensor, excitation channel carrying an excitation signal of the grafted fluorescent molecules at its end, and emission channel carrying the light emitted by the fluorescent molecules.

Estimating the pH value can be done in different ways, for example by means of a protocol using the shape of the fluorescence spectrum, i.e. the totality of the measurement points supplied by the spectrometer.

This protocol can be implemented for example when molecules of fluorescein diacetate, a common cost-effective fluorophore that is stable and has a high quantum efficiency (0.93) are used. When the surrounding pH value increases, the fluorescein diacetate molecule deprotonates more or less, resulting in four species (cationic, neutral, anionic and dianionic forms). To calculate the concentrations of each species, three mass action laws are necessary, characterized by different pKa (2.2; 4.3 and 6.38). Only the anionic and dianionic species are fluorescent. The others are converted, in a certain proportion, to anionic form and accordingly participate in the fluorescence. The present protocol can be applied with reference to the publication "Calibration free and fluorescein based fiber optic pH sensor for clinical applications", Bernard Gauthier-Manuel et al., IEEE SENSORS, 28-31 October, New Delhi, 2018, Proceedings IEEE Sensors, ISBN: 978-1-5386-4707-3, Part Number: CFP18SEN-ART, pp. 1173-1176.

Generally, the principle is to obtain a mathematical function Fluo ($\lambda$, pH, $pKa'_1$, $pKa'_2$, $pKa'_3$) representing the fluorescence spectrum of the grafted fluorescein depending only on the wavelength $\lambda$, the pH and the three apparent acidity constants $pKa'_1$, $pKa'_2$, $pKa'_3$ etc. that are a function of the environment seen by the grafted molecules. A simple adjustment of a spectrum measured with the function k*Fluo( ) will give the value of the pH seen by the sensor as well as the values of the pKa', the parameter k taking account of the concentration of fluorescent molecules at the fibre end.

The present invention thus makes it possible to measure the pH in biological or physicochemical systems, but it can also be applied to measuring ions such as $Ca^{++}$, $Mg^{++}$ ions, etc.

Of course, the invention is not limited to the examples that have just been described, and numerous modifications may be made to these examples without exceeding the scope of the invention.

The invention claimed is:

1. A method for manufacturing an ion sensor based on an optical fibre, this method comprising the following steps:
   cleavage of the optical fibre, with free hydroxyl groups appearing on the cleaved surface;
   grafting a layer of trifunctional silane directly on free hydroxyl groups having thus appeared on the cleaved surface of the optical fibre, without a prior exogenous activation step;
   grafting a layer of difunctional silane on the cleaved surface of the optical fibre; and
   grafting a fluorescent dye.

2. The method according to claim 1, wherein the difunctional silane is an amino-silane compound, making it possible to constitute a surface of amine compounds for grafting the fluorescent dye.

3. The method according to claim 2, wherein grafting the fluorescent dye is carried out by using a succinimidyl ester function as coupling agent with the aminated surface.

4. The method according to claim 2, wherein grafting the fluorescent dye is carried out by using a sulfonyl chloride as coupling agent with the aminated surface.

5. The method according to claim 2, wherein grafting the fluorescent dye is carried out by using an isothiocyanate function as coupling agent with the aminated surface.

6. The method according to claim 1, wherein difunctional silane is a thiol compound making it possible to constitute a surface of thiol compounds for grafting the fluorescent dye.

7. The method according to claim 6, wherein grafting the fluorescent dye is carried out by using an iodoacetamide as coupling agent with the surface of thiol compounds.

8. The method according to claim 6, wherein grafting the fluorescent dye is carried out by using a maleimide as coupling agent with the surface of thiol compounds.

9. The method according to claim 1, wherein the step of grafting the layer of trifunctional silane is carried out within the 30 minutes following cleavage of the optical fibre.

10. The method according to claim 9, wherein the step of grafting the layer of trifunctional silane is carried out within a period of time of less than 1 minute following cleavage of the optical fibre.

11. The method according to claim 1, wherein the optical fibre has a hydroxyl ion content greater than 10 ppm.

12. The method according to claim 1, wherein the silane comprises at least one reactive radical of the C1-10 alkoxy group.

13. The method according to claim 1, wherein the silane comprises at least one ethoxy or methoxy reactive radical.

14. The method according to claim 1, wherein the silane comprises at least one reactive radical based on halogen atoms.

15. The method according to claim 1, wherein the steps of grafting a layer of trifunctional silane and grafting a layer of difunctional silane are carried out simultaneously by a mixture containing less than 1% trifunctional silane.

16. A system for optical measurement of pH of a solution, comprising:
   an ion sensor based on an optical fiber manufactured by the method of claim 1, including fluorescent molecules being grafted on a first end of the optical fibre;
   a light source for exciting the fluorescent molecules from a second end and via the optical fibre;
   a spectrometer for obtaining a fluorescence signal originating from the fluorescent molecules via the second end; and
   a processing unit for determining the pH content of the solution.

* * * * *